United States Patent [19]

Allread

[11] 4,312,524
[45] Jan. 26, 1982

[54] SELF-ALIGNING COUPLING

[75] Inventor: Alan R. Allread, Jackson, Mich.

[73] Assignee: Aeroquip Corporation, Jackson, Mich.

[21] Appl. No.: 101,097

[22] Filed: Dec. 7, 1979

[51] Int. Cl.³ ............................................... F16L 3/04
[52] U.S. Cl. ................................ 285/161; 285/137 R; 285/347
[58] Field of Search .................... 285/161, 158, 137 R, 285/19, 31, 192, 351, 223, 347, 224, DIG. 7, 375, 316, 24, 27

[56] References Cited

U.S. PATENT DOCUMENTS

| | | | |
|---|---|---|---|
| 1,383,487 | 7/1921 | Rutledge | 285/158 X |
| 2,470,800 | 5/1949 | Ashton | 285/375 X |
| 2,889,158 | 6/1959 | Catey | 285/158 X |
| 3,094,364 | 6/1963 | Lingg | 285/161 X |
| 3,226,136 | 12/1965 | Broden | 285/192 X |
| 3,227,475 | 1/1966 | Sinkinson | 285/375 X |
| 3,527,480 | 9/1970 | Larson | 285/137 R |
| 4,078,834 | 3/1978 | Hauff | 285/158 X |
| 4,208,270 | 6/1980 | Grieve et al. | 285/137 R |

*Primary Examiner*—Dave W. Arola
*Attorney, Agent, or Firm*—Beaman & Beaman

[57] ABSTRACT

A fluid coupling for use with plural conduit system manifolds wherein a plurality of couplings are mounted upon common support structure. Each opening incorporates alignment structure permitting a limited degree of self-alignment to insure efficient sealing between the coupling parts. The alignment structure includes biasing means for maintaining axial alignment and sealing pressures, and radial clearances and elastomer members are employed to permit radial alignment.

3 Claims, 3 Drawing Figures

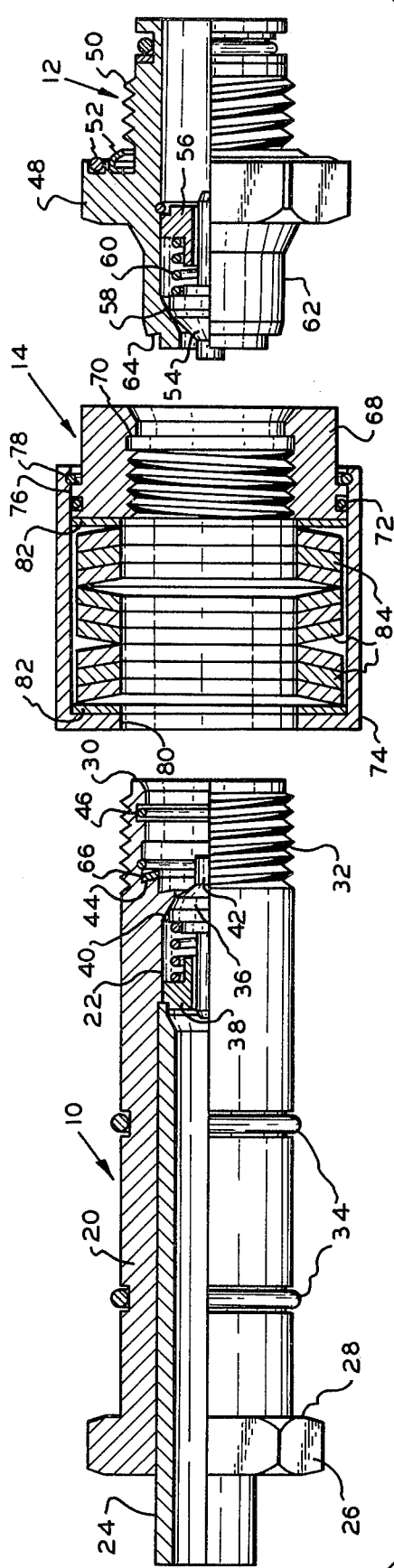
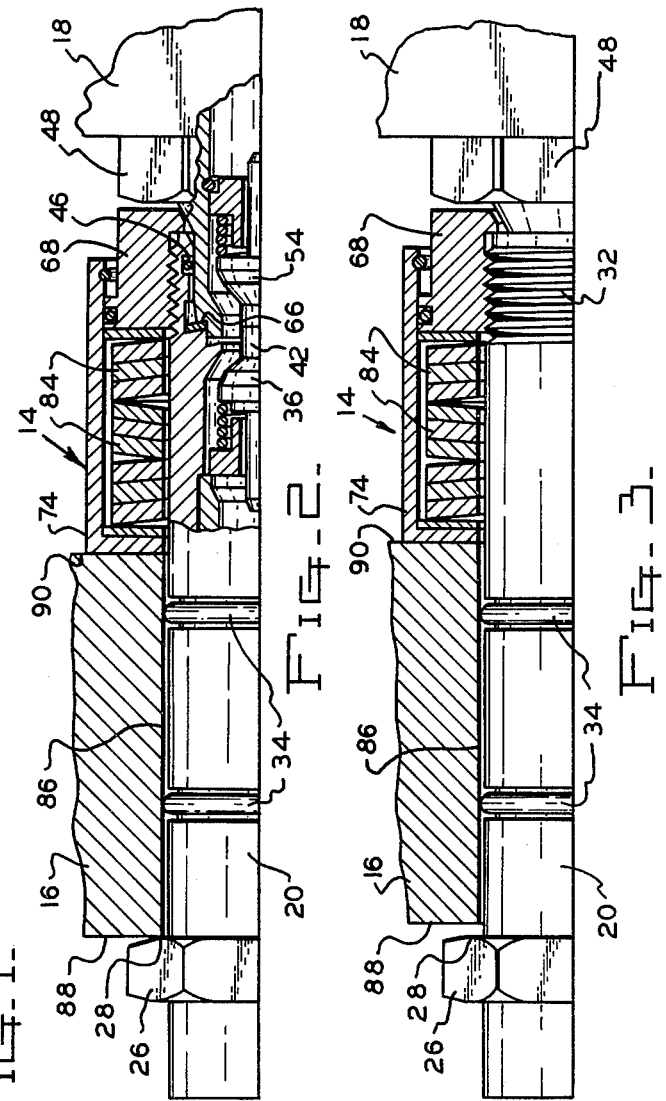

SELF-ALIGNING COUPLING

BACKGROUND OF THE INVENTION

Fluid couplings normally consist of interconnectable parts or halves each including connection means, such as nut structure, threads, snap locks, locking balls, or similar conventional devices. The fact that the connection means is directly carried by the coupling parts assures alignment of the coupling parts and will maintain a leak proof interconnection as long as the connecting means remains in the locked or coupling position.

In special applications it is sometimes desired that a plurality of fluid couplings be mounted upon a common support defining a plural conduit system manifold whereby proper positioning of the support permits a plurality of coupling halves to simultaneously sealingly mate with a like plurality of interengaging coupling halves to complete a plurality of conduit systems. Such installations are used in the petroleum exploration and drilling arts, of instance, wherein the aforedescribed interconnection of a plurality of conduit systems are used to power hydraulic tools and may take place under submerged conditions several hundred feet below the ocean's surface in offshore drilling rigs. Under such adverse conditions close supervision and adjustment of individual couplings is not possible. In such installations the support member may be lowered into position relative to a fixed support member to align the coupling parts mounted on each support member, and once aligned the support members are moved toward each other to permit coupling of the complimentary coupling parts. The maintaining of the relationship of the support members may be achieved by large coupling locks, however, because of manufacturing tolerances, inconsistencies in coupling parts installation, slight misalignment of the support members, or the inability to achieve accurate position of the support members, slight misalignments may occur in the mating coupling components resulting in leakage. Such leakage, especially of petroleum products, has adverse environmental impact, is in violation of environmental laws, and is not acceptable. Leakage is especially likely to occur where the sealing between coupling halves is accomplished through metal-to-metal seals, as are often used in high pressure fluid systems.

It is an object of the invention to provide a self-aligning fluid coupling for use with a support member manifold wherein the mounting of a coupling half upon the support member permits a limited degree of relative movement between the coupling half and support member for self-aligning purposes without adversely affecting efficiency of the completed fluid coupling.

Another object of the invention is to provide a self-aligning fluid coupling having a half mounted within a support member wherein the mounted coupling half is capable of limited axial and radial movement with respect to the support member, and axial movement is through a resilient biasing system producing sufficient force to maintain a sealed relationship between metal-to-metal seals.

In the practice of the invention the self sealing coupling halves are mounted on relatively large support members adapted to be moved toward and away from each other. For instance, one support member may constitute a stationary manifold fixed relative to a foundation, well installation or other structure, and a movable support member may constitute a manifold which is lowered toward the fixed manifold, and each manifold support member includes a plurality of conduit systems associating with the coupling halves mounted on the support members. As the movable support member approaches the fixed member the plurality of couplings simultaneously interengage wherein fluid communication between mating coupling halves exists upon the support members achieving the intended final positioning relative to each other.

As each support member, or manifold, includes a plurality of coupling halves, and as slight misalignments may exist with respect to the mating coupling halves one of the coupling halves, in accord with the invention, is provided with self-aligning means to compensate for inaccuracies or misalignments wherein an effective, leakproof, metal-to-metal sealing occurs between interconnected couplings.

The coupling sealing ends of the halves include annular radial surfaces for abutting an annular seal ring, and, usually, each coupling half will include a self-sealing valve, usually of the poppet type, which are mutually engageable during connection of the coupling halves and fully automatically opened upon the coupling being completed. The support members containing the self-aligning coupling half includes a bore receiving the coupling half, the diameter of the bore being slightly greater than the diameter of the coupling half portion received therein wherein limited relative radial movement is permitted. Annular resilient rings circumscribe the coupling half within the bore resiliently centering the coupling half therein, yet permitting relative radial displacement for alignment purposes.

The coupling half is also axially slidable within the support member bore for axial self-aligning movement, and a biasing unit which consists of a plurality of Belleville washers is mounted upon the coupling for imposing a high axial force on the coupling half sufficient to overcome fluid pressures within the coupling endeavoring to reduce the sealing forces. The presence of the biasing structure permits an effective interconnection between the mating coupling parts regardless of misalignment occurring between the support members, or the couplings mounted upon the support members.

BRIEF DESCRIPTION OF THE DRAWINGS

The aforementioned objects and advantages of the invention will be appreciated from the following description and accompanying drawings wherein:

FIG. 1 is an elevational, partially sectioned, view of the components of a self-aligning coupling in accord with the invention, the biasing unit being removed from the self-aligning coupling half, and the coupling halves being uncoupled and their self sealing valves in the closed condition, FIG. 2 is an elevational view, partially sectioned, illustrating the relationship of coupling components when coupled, prior to compression of the biasing means, and FIG. 3 is an elevational view, partially sectioned, illustrating the position of the components with the biasing structure under compression.

DESCRIPTION OF THE PREFERRED EMBODIMENT

The basic coupling components are illustrated in FIG. 1 wherein the self-aligning coupling half is generally indicated at 10, the male coupling half is generally indicated at 12, and the biasing unit which is mounted upon half 10 is generally indicated at 14. In FIG. 1 the biasing unit 14 is shown in an aligned, but disassembled relationship, relative to half 10. The coupling half 10 is mounted within a support member 16, FIG. 2, while the coupling member 12 is mounted within support member 18, and the support members 16 and 18 may constitute manifolds or other members which may include positioning and locking structure, not shown, for maintaining the support members in a final predetermined spacial relationship.

The female coupling half 10 consists of an elongated cylindrical tubular body 20 internally provided with a concentric passage 22 in which a connection sleeve 24 may be affixed having an exposed end constituting a conduit connection end for attachment with a conduit, not shown. The body 20 is provided with a radially extending hexagonal flange 26 defining radial shoulder 28, at one end, and at its coupling sealing end 30 the body is externally provided with threads 32. Intermediate its ends a pair of axially spaced grooves each contain an elastomeric O-ring 34, for purposes which will be later apparent.

Interiorly, the body 20 is provided with a spring biased poppet valve 36 supported within spider 38 and normally maintained in a sealed relationship with conical seat 40 defined in the body passage. The poppet valve includes an extension 42 for engagement with a like extension defined upon the poppet valve of coupling half 12 permitting the self sealing valves to engage and open upon coupling assembly.

At its sealing end 30, the body 20 also includes a conical sealing surface 44, and an annular groove for receiving O-ring 46 for engagement with the male coupling half.

The male coupling half 12 includes a body 48 exteriorly threaded at 50 for threaded connection with a bore defined in the associated support member 18 and seal rings 52 assure a sealed relationship with the support member. Internally, body 48 includes a passage in which poppet valve 54 is slidably supported within spider 56 and biased toward a normally closed condition in engagement with seat 58 by spring 60. Exteriorly, body 48 includes cylindrical surface 62, and an oblique sealing surface 64 for engagement with the metal sealing ring 66.

The biasing unit 14 includes a threaded collar 68 having a radial stop surface 70 permitting the collar to be threaded upon threads 32 in the manner apparent in FIG. 2. The collar 68 includes an O-ring 72 to permit a sealed relationship with annular cap 74, and the cap is slidably supported upon the collar by a cylindrical surface 76. A snap ring 78 received within a groove formed in the cap retains the cap upon the collar.

The cap 74 is formed with a concentric opening 80 permitting the collar to slip over the body 20 and hard washers 82 are located adjacent radial surfaces of the collar and the cap as will be appreciated from FIG. 1. Intermediate the washers 82, a plurality of Belleville spring washers 84 are stacked as shown in FIG. 1, three washers being stacked in a set wherein the oblique configuration of the washers is alternated, and in FIG. 1 the washers are shown in a non-compressed condition.

The support member 16 includes cylindrical bores 86 receiving the coupling halves 10, and the diameter of the bore 86 is greater than the diameter of the body 20 as will be appreciated from FIGS. 2 and 3. The body 20 is inserted in the bore 86 conduit, coupling end 30 first, and the biasing unit 14 is then threaded upon the body in the manner shown in FIG. 2. Under normal conditions the dimensions of the support member 16 between surfaces 88 and 90 is such that engagement of the cap 74 with surface 90 and surface 88 with shoulder 28 will occur without placing the Belleville spring washers 84 under significant compression.

Upon the coupling half 10 being assembled to the support member 16 in the manner described above, and the coupling half 12 being threaded into the support member 18, the support member 16, usually being the movable support member, is moved toward support member 18 to engage the coupling halves 10 and 12 in the manner shown in FIG. 2. Such engagement results in the extensions of the poppet valves 36 and 54 engaging to unseat the valves and permit fluid flow through the coupling. Additionally, the mating of the coupling halves engages the O-ring 46 with the male half surface 62, and the metal seal ring 66 is compressed between the sealing surfaces 44 and 64 establishing a fluid-tight metal-to-metal seal between the coupling halves. Preferably, the seal ring 66 is of the type manufactured by the assignee, Aeroquip Corporation, under the trademark "Conoseal" and this ring will be initially carried in body 20.

The disclosed couplings may be employed in manifolds wherein a plurality of couplings are mounted upon the support members 16 and 18, such as used in subterranean oil exploration and recovery for transferring hydraulic oil to hydraulic tools used underwater. To prevent leakage the seal ring 66 must be engaged by the surfaces 44 and 64 with sufficient pressure to resist hydraulic pressure forces within the couplings, and the biasing unit 14 permits the coupling halves to be forced together with sufficient axial force to maintain such a sealed relationship. Accordingly, the preferred final dimension between the support members 16 and 18 is such that the spring washers 84 will be substantially compressed such as shown in FIG. 3 which results in limited relative axial movement between the coupling half 10 and the support member 16 separating the shoulder 28 from support member surface 88 as appreciated in FIG. 3. Under these conditions the spring washers 84 maintain a uniform axial force on the coupling half 10 to the right, FIG. 3, to insure the desired sealing engagement with ring 66. The axial force exerted by the springs 84 is at least equal to hydraulic end load forces imposed upon the coupling insuring efficient sealing under all conditions. The presence of the biasing unit 14 will accommodate manufacturing tolerances and slight axial misalignments occuring within the various couplings mounted upon the support members 16 and 18, and the biasing unit thereby automatically permits axial alignment of couplings of the disclosed type.

In the event of slight radial misalignment between the coupling halves 10 and 12 the clearance between the body 20 and the support member bore 86 will permit limited radial movement of the body 20 within the bore due to the resilient nature of the rings 34, and this radial alignment further insures proper orientation of the coupling halves during connection.

When the support members 16 and 18 are separated, the respective poppet valves 36 and 54 will engage their associated seats, the spring washers 84 will return the coupling half 10 to the relationship shown in FIG. 2 wherein shoulder 28 engages surface 88, and the self-sealing coupling halves may be completely separated without the loss of the pressurized hydraulic oil therein.

It is appreciated that various modifications to the inventive concepts may be apparent to those skilled in the art without departing from the spirit and scope of the invention.

I claim:

1. A self-aligning fluid coupling for mounting within a movable support member having a cylindrical bore and a radial shoulder transversely intersecting the bore wherein the coupling is capable of axial displacement within the bore comprising, in combination, an elongated tubular body having an axis, a cylindrical exterior surface of a diameter slightly less than that of the support membr bore, a conduit connection end, a coupling sealing end, and a thread defined upon said exterior surface adjacent said sealing end, an annular threaded collar threaded upon said threads, an annular cap slidably mounted upon said cap for axial movement thereon relative to said body, said cap including a shoulder disposed toward said body conduit connection end, compression spring means interposed between said collar and cap biasing said cap toward said body conduit connection end, abutment means mounted on said cap engaging said collar limiting axial movement of said cap on said collar under the influence of said spring means, said cap shoulder selectively engaging the support member shoulder whereby axial force may be imposed upon said cap and body by the support member through said spring means.

2. In a self-aligning fluid coupling as in claim 1 wherein said spring means comprises a plurality of stacked, annular, non-planar washers circumscribing said body coupling sealing end.

3. In a self-aligning fluid coupling as in claim 1, annular elastic rings axially spaced on said body exterior surface engaging the support member bore permitting limited radial displacement of said body relative to the support member bore.

* * * * *